April 4, 1961     H. B. MATTHEWS     2,977,764
ACTUATOR AND CONTROL SYSTEM THEREFOR
Filed April 15, 1959     3 Sheets-Sheet 1

INVENTOR
HUGH B. MATTHEWS
BY
HIS ATTORNEY

April 4, 1961   H. B. MATTHEWS   2,977,764
ACTUATOR AND CONTROL SYSTEM THEREFOR
Filed April 15, 1959   3 Sheets-Sheet 3

INVENTOR.
HUGH B. MATTHEWS
BY
W. E. Finkum
HIS ATTORNEY

United States Patent Office 2,977,764
Patented Apr. 4, 1961

2,977,764

ACTUATOR AND CONTROL SYSTEM THEREFOR

Hugh B. Matthews, Birmingham, Mich., assignor to General Motors Corporation, Detroit, Mich., a corporation of Delaware Filed Apr. 15, 1959, Ser. No. 806,656

6 Claims. (Cl. 60—51)

This invention pertains to hydraulic actuators, and particularly to a hydraulic actuator connected in a closed hydraulic loop and means for controlling the movement of the actuator in opposite directions.

Heretofore, in hydraulic actuator systems it has been customary to utilize a reservoir for hydraulic fluid, a pump for drawing hydraulic fluid from the reservoir and delivering the hydraulic fluid under pressure to a valve, and conduits interconnecting the valve and opposite sides of the actuator, so that during actuator adjustment fluid under pressure is supplied to one side thereof and the opposite side is drained back to the reservoir. When systems of this type are installed in vehicles numerous seals and flexible connections are required which are susceptible to developing leaks. The present invention relates to an actuator system wherein each actuator is connected in a closed hydraulic loop with a pump whereby the likelihood of leaks developing in the system is reduced to a minimum. In addition, the actuator embodies an accumulator in one chamber thereof for preventing the formation of voids in the actuator chambers. Accordingly, among my objects are the provision of an actuator system of the closed hydraulic loop type; the further provision of an actuator designed for closed loop operation including an accumulator for preventing voids therein; the further provision of a control system for a closed loop hydraulic actuator; and the still further provision of a control system for a closed loop hydraulic actuator including a pump and manually controlled check valve arrangement for enabling movement of the actuator in both directions.

The aforementioned and other objects are accomplished in the present invention by withdrawing small quantities of hydraulic fluid from one side of the actuator piston and supplying this hydraulic fluid under pressure to the other side of the actuator piston to effect movement thereof. Specifically, in the disclosed embodiment the actuator is of the linear type comprising a cylinder having a reciprocable piston therein. The piston divides the cylinder into opposed chambers and includes a rod which extends outside of the cylinder for connection to any suitable load device. The rod end cylinder chamber contains a torus of closed cell foam material which constitutes an accumulator.

Opposed chambers of the actuator cylinder are connected to a check valve assembly including four one-way check valves which are normally maintained in the closed position. The check valves are grouped in pairs, and when closed prevent the flow of fluid either to or from both chambers of the actuator cylinder. A manual operator is provided for the check valves to control the direction of fluid flow between the cylinder chambers. Thus, when the actuator is to be adjusted a check valve which normally blocks flow from one chamber is mechanically displaced from its seat and a check valve which normally blocks flow to the other chamber is mechanically displaced from its seat.

The check valves also connect with a pump cylinder containing a reciprocable piston having an intake stroke and a delivery stroke. The pumping piston may be integral with a motor piston constituting a pressure intensifier. In other words, the motor piston is disposed in a cylinder having a cross-sectional area appreciably greater than the pump cylinder, and can be operated by differential pressures of relatively small magnitude and still develop hydraulic pressures of substantial magnitude. As disclosed, the pump motor may be actuated by the pressure differential between a source of vacuum, such as an engine manifold, and atmospheric pressure. The pressure differential motor may be of any suitable type and thus includes a piston actuated reversing valve for alternately subjecting opposite sides of the motor piston to pressure differentials so as to maintain the piston in a state of continuous reciprocation as long as the manual control valve is open. In the disclosed embodiment the manual control valve for the pressure differential operated motor and the mechanical control for the check valves of the actuator are operated by a single control device whereby the pressure differential motor will be arrested when the actuator control is in the "off" position.

Further objects and advantages of the present invention will be apparent from the following description, reference being had to the accompanying drawings, wherein a preferred embodiment of the present invention is clearly shown, and wherein like numerals denote like parts throughout the several views.

Figure 1:
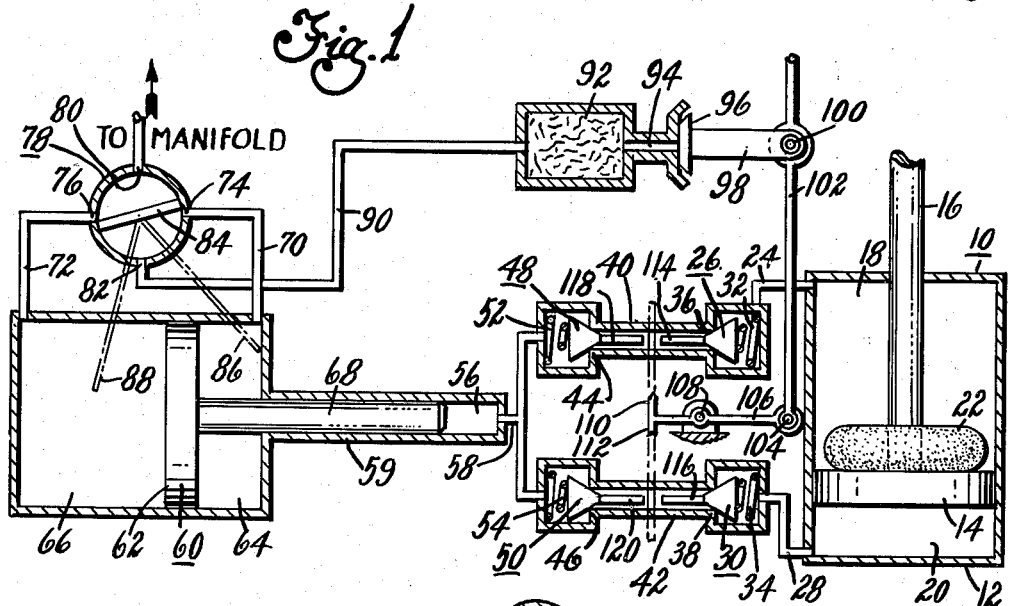
Figure 1 is a schematic view of an actuator and control system therefor constructed according to the present invention with the control in the "off" position.

With particular reference to Figure 1, the actuator system of the present invention includes an actuator 10 having a cylinder 12 within which a reciprocable piston 14 is disposed. The piston 14 has a rod 16 attached thereto which extends outside of the cylinder 12. In addition, the piston 14 divides the cylinder into a rod end chamber 18 and a head end chamber 20. By virtue of the rod 16, the area of the piston 14 presented to the chamber 20 is greater than the area of the piston 14 presented to the chamber 18. A torus 22 composed of any suitable resilient closed cell plastic foam, such as polyurethane, is disposed within the rod end chamber 18, and functions as an accumulator in a manner to be pointed out more particularly hereinafter.

Figure 2:
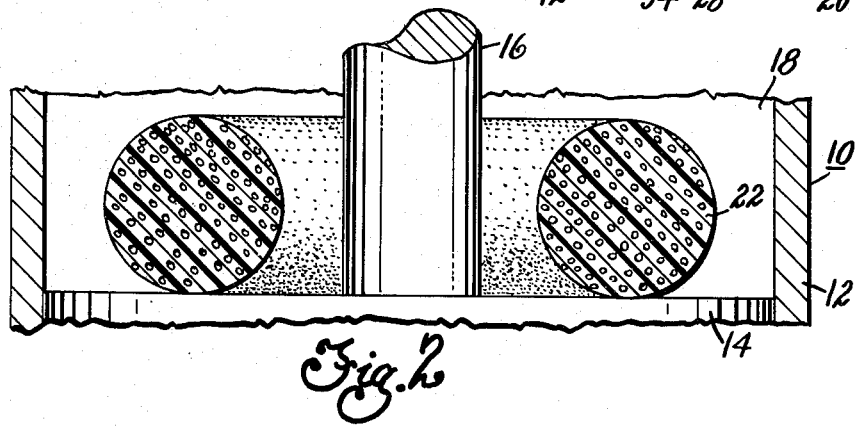
Figures 2 and 3 are fragmentary views, partly in section and partly in elevation, depicting the accumulator in the actuator cylinder.
Figure 3:
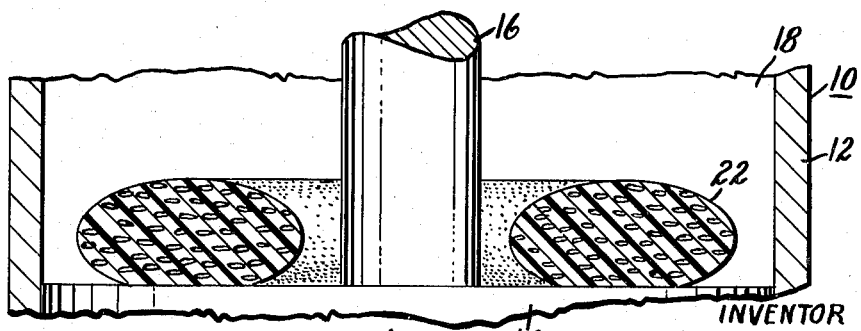

With reference to Figures 2 and 3, the torus 22 can be suitably held in assembled relation with the rod end surface of the piston 14 by cementing or bonding it thereto. Since the torus is composed of closed cell plastic foam it can be compressed, as shown in Figure 3, to effectively increase the volume of the rod end chamber 18. Moreover, since the closed cell foam does not absorb or retain hydraulic fluid, it will assume its normal shape, such as shown in Figure 2, when it is not subjected to hydraulic fluid under pressure due to its inherent resiliency. As will be pointed out more particularly hereinafter, the accumulator constituted by the torus 22 prevents the existence of voids within the actuator chambers.

As alluded to hereinbefore, the actuator is connected in a closed hydraulic loop. Thus, the rod end chamber is connected by a passage 24 with a check valve 26, and the chamber 20 is connected by a passage 28 with a check valve 30. Check valves 26 and 30 are schematically depicted as being normally maintained in closed positions by springs 32 and 34 so as to prevent the flow of hydraulic fluid from the chambers 18 and 20. The check valves 26 and 30 are of the one-way type, and thus can be actuated by hydraulic fluid under pressure to permit flow of hydraulic fluid to the actuator chambers 18 and 20, and thus can be termed outlet check valves for the pump means to be described hereinafter.

The check valves 26 and 30 coact with valve seats 36 and 38 which are schematically shown as being formed at the end of conduits 40 and 42, respectively. The conduits 40 and 42 also have valve seats 44 and 46 at their other ends. Check valves 48 and 50 coact with the valve seats 44 and 46. The check valves 48 and 50 are likewise of the one-way type and are schematically depicted as being normally maintained in closed positions by springs 52 and 54, respectively. The check valves 48 and 50 communicate with a pumping chamber 56 through passage means 58, and may be termed inlet check valves for the pump means.

The pumping chamber 56 is formed in a stepped diameter cylinder 59, containing a stepped diameter piston 60. The stepped diameter piston 60 includes a head portion 62 which divides the larger diameter bore in the cylinder 59 and a pair of opposed chambers 64 and 66. The piston 60 also includes a rod 68 of smaller diameter which is reciprocable in the smaller diameter bore of the cylinder 59 and constitutes a pump piston.

The piston head 62 can be subjected to differential pressures in opposite directions and constitutes a motor for actuating the pump piston 68. Accordingly, the motor chambers 64 and 66 are connected by passages 70 and 72 to ports 74 and 76, respectively, of a reversing valve 78. The reversing valve also includes a vacuum port 80, an atmospheric port 82 and a rotary valve element 84 which is operable to alternately connect the ports 74 and 76 with atmospheric pressure and vacuum. As schematically depicted, the rotary valve 84 has a pair of arms 86 and 88 disposed within the motor chambers 64 and 66, respectively. The arms 86 and 88 are alternately engageable by the piston head 62 adjacent the stroke ends thereof for shifting the valve 84 so as to maintain the piston 62 in a state of continuous reciprocation.

The vacuum port 80 can be connected to any suitable source of sub-atmospheric pressure, such as the intake manifold of an internal combustion engine. The atmospheric port 82 is connected by a passage 90 to an air filter 92. The air filter connects with an air port 94 which can be closed by a valve 96. The valve 96 is attached to a lever 98 pivotally connected at 100 to a reciprocable rod 102. The reciprocable rod 102 constitutes the manual control for the actuator system.

The lower end of the rod 102 is pivotally connected at 104 to one end of a lever 106. The lever 106 has an intermediate pivot 108 carried by a fixed support, and the other end of the lever is connected to a check valve operating lever having oppositely extending arms 110 and 112. When the rod 102 is moved upwardly, as viewed in Figure 1, the air valve 96 will be opened through the lever 98, the check valve 48 will be mechanically opened by the arm 110 and the check valve 30 will be manually opened by the arm 112 through the lever 106. In order to facilitate mechanical opening of the check valves 26 and 30, 48 and 50, these valves include stem portions 114, 116, 118 and 120, respectively. On the other hand, when the rod 102 is moved downwardly from the position shown in Figure 1, the air valve 96 will be opened through the lever 98, and the check valves 26 and 50 will be mechanically opened by the arms 110 and 112, respectively, through the lever 106, as viewed in Figure 6.

Operation

Figure 4:
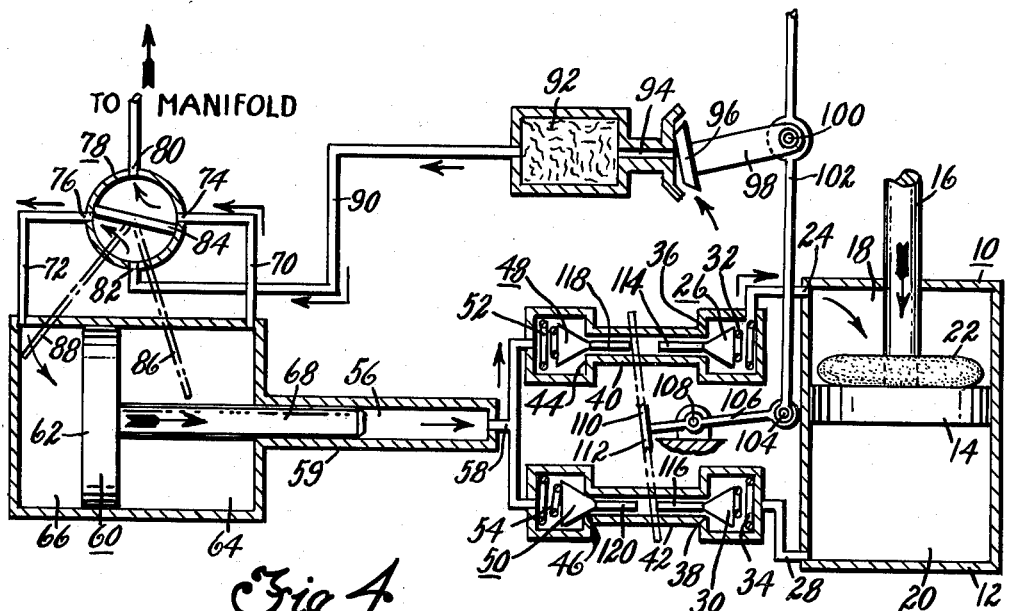
Figures 4 through 7 are schematic views similar to Figure 1 illustrating operation of the actuator and control system as the actuator is moved in opposite directions.
Figure 5:
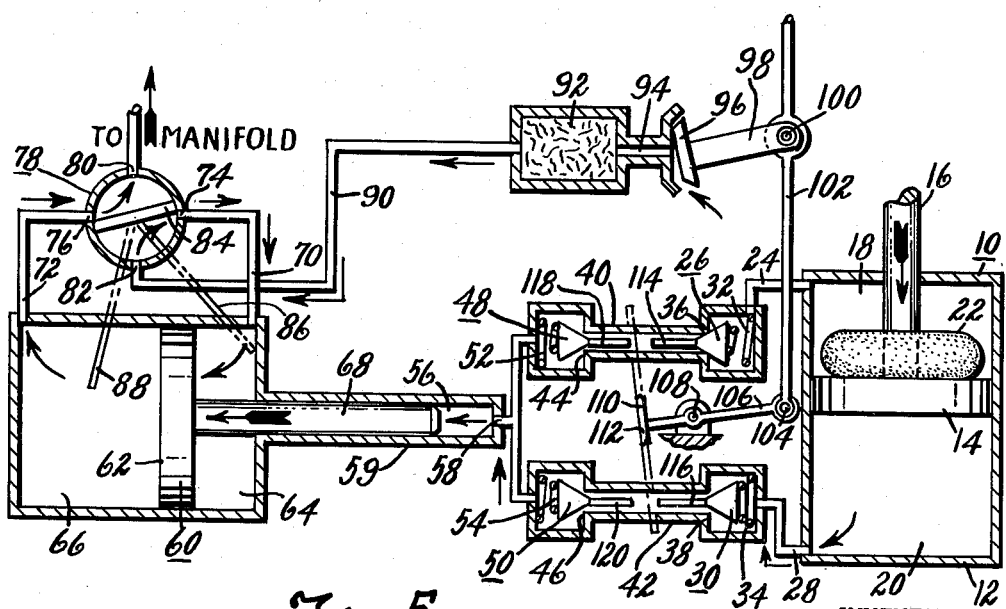

With particular reference to Figures 4 and 5, operation of the actuator system in retracting the piston 14 and the rod 16 is as follows. When the rod 102 is moved upwardly, the air valve 96 is opened, as are check valves 48 and 30. Accordingly, the chambers 64 and 66 of the motor will be subjected to a pressure differential through the reversing valve 78. If the valve element 84 is in the position of Figure 4 when the rod 102 is operated, the motor chamber 66 will be subjected to atmospheric pressure through passage 90, ports 82 and 76, and passage 72, while the motor chamber 64 will be connected to vacuum through passage 70 and ports 74 and 80. Therefore, the piston 60 will move to the right to effect the delivery stroke of the pump piston 68. The actuator chambers 18 and 20 are maintained full of hydraulic fluid at all times. Accordingly, during the delivery stroke of the pump, hydraulic fluid under pressure will flow through passage 58, the valve seat 44 of the open check valve 48 and into the conduit 40. The pressure of the fluid in the conduit 40 will open the check valve 26 to permit the flow of hydraulic fluid under pressure through passage 24 to the rod end chamber 18. Since the chamber 20 is full of hydraulic fluid which is substantially incompressible, the relatively small quantity of additional hydraulic fluid being pumped into chamber 18 will result in compression of the torus accumulator 22.

As the piston 62 approaches its right hand stroke end limit, as viewed in Figure 4, it will engage arm 86 and move the rotary valve 84 from the position of Figure 4 to the position of Figure 5. This movement of the rotary valve 84 will reverse the pressure differential acting on the piston 62 thereby causing the piston 62 to move to the left, as viewed in Figure 5. As the piston 62 moves to the left the pumping chamber 56 is expanded thereby constituting the intake stroke of the pump. At this time, hydraulic fluid is drawn from the head end chamber 20 through passage 28 and through valve seat 38 of the open check valve 34 into the conduit 42. The pressure differential acting on the check valve 50 will move it off its seat 46 and permit the hydraulic fluid to flow through passage means 58 to the pump chamber 56. Since hydraulic fluid is being withdrawn from the head end chamber 20, the torus accumulator 22 expands and thus moves the piston 14 downwardly to prevent the formation of void in chamber 20. As the piston 62 approaches its left hand stroke end position, it will engage the arm 88 to again actuate the reversing valve 78 whereupon the delivery stroke of the pump will be effected.

When the actuator piston 14 has been extended to the desired position, the rod 102 is returned to the position shown in Figure 1. The closing of the air valve 96 through the lever 98 arrests movement of the motor piston 62. In addition, movement of the arms 110 and 112 to the center position shown in Figure 1 enables all of the check valves to be closed whereby the flow of hydraulic fluid either to or from the actuator chambers is blocked.

It is pointed out that the cross-sectional area of the motor piston 62 is appreciably greater than the cross-sectional area of the pump piston 68. This relationship enables the motor and pump assembly to operate as a pressure intensifier in direct proportion to the relative cross-sectional area of the pistons 62 and 68. Thus, with a relatively small pressure differential for actuating the motor, by proportioning the cross-sectional areas of the pistons 62 and 68 hydraulic pressures of substantial magnitude can be produced by the pump piston 68.

Figure 6:
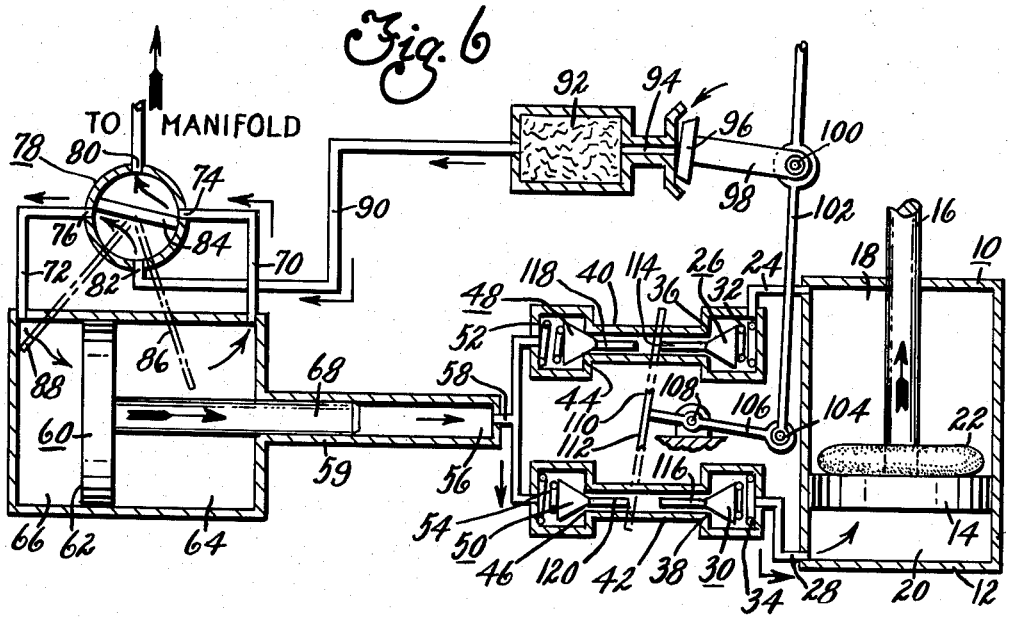
Figure 7:
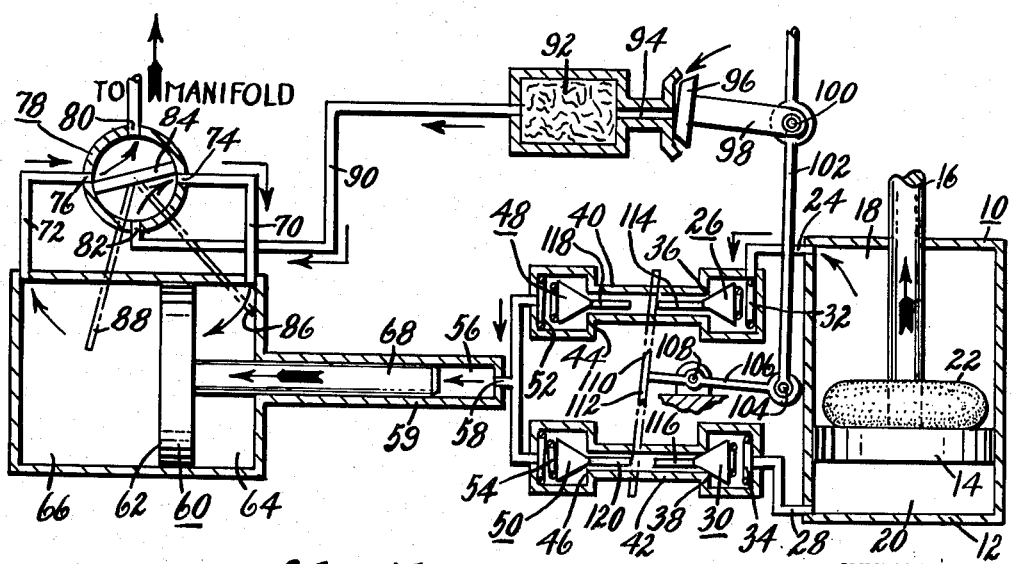

With reference to Figures 6 and 7, in order to extend the actuator piston 14, the rod 102 is moved downwardly from the position of Figure 1 to the position of Figure 2. By moving the rod 102 downwardly, the air valve 96 is opened through the lever 98 and the check valves 26 and 50 are mechanically opened by arms 110 and 112, respectively, through the lever 106. Assuming the reversing valve 78 to be in the position of Figure 6 when the rod 102 is moved downwardly, the motor piston 62 will be subjected to the pressure differential so as to move to the right thereby effecting the delivery stroke of the pump.

During a delivery stroke of the pump piston 68, hydraulic fluid under pressure is forced through passage means 58 through the valve seat 46 of the open check valve 50 into the conduit 42. This hydraulic fluid under pressure opens the check valve 30 to permit hydraulic fluid under pressure to flow through passage 28 to the head end chamber 20 of the actuator. Since the rod end chamber 18 is filled with hydraulic fluid, the additional fluid pumped through the head end chamber 20 will effect upward movement of the piston 14 by compression of the torus accumulator 22.

When the motor piston 62 approaches its right hand stroke limit, the valve element 84 will be rotated from the position of Figure 6 to the position of Figure 7 through the arm 86 thereby reversing the pressure differential to which piston 62 is subjected whereupon the piston 62 will move to the left as viewed in Figure 7. As the piston 62 moves to the left, the pumping chamber 56 is expanded thereby drawing a small quantity of hydraulic fluid from the rod end chamber 18 to the valve seat 36 of the open check valve 26 and into the conduit 40. The pressure differential acting on the check valve 48 will move the check valve 48 away from its seat 44 and permit hydraulic fluid to flow through the passage 58 to the pumping chamber 56. Since hydraulic fluid is being withdrawn from the rod end chamber 18 the torus accumulator 22 expands to prevent the formation of a void in the chamber 18 as the piston 14 does not move. When the reversing valve 78 is actuated by the piston 62 through arm 88 adjacent the left hand stroke end of the motor piston 62, the hydraulic fluid withdrawn from the rod end chamber 18 will be pumped into the head end chamber 20. When the actuator piston 14 has been retracted the desired amount, the rod 102 is returned to its off position as shown in Figure 1 thereby arresting operation of the differential motor and enabling the check valves 26, 30, 48 and 50 to close and thereby prevent the flow of hydraulic fluid either to or from the actuator chambers 18 and 20.

From the foregoing it is readily apparent that the present invention provides a unique hydraulic actuator control system of the closed loop type wherein hydraulic fluid is circulated between the opposed actuator chambers to effect actuator movement. In addition, the actuator embodies an accumulator which prevents the existence of voids in either actuator chamber when hydraulic fluid is being withdrawn therefrom.

While the embodiment of the invention as herein disclosed constitutes a preferred form, it is to be understood that other forms might be adopted.

What is claimed is as follows:

1. In combination, a hydraulic actuator having a cylinder with a reciprocable piston disposed therein, said piston dividing said cylinder into a pair of opposed chambers, said chambers being filled with hydraulic fluid, accumulator means in only one of said chambers for preventing the formation of voids in said chambers when hydraulic fluid is withdrawn from either of said chambers, pump means having an intake stroke and a delivery stroke, means interconnecting said pump means and said chambers including four normally closed one-way check valves, said check valves being capable of pressure actuation to an open position, two of said check valves being inlet valves seating in one direction and two of said check valves being outlet valves seating in the opposite direction, and means for mechanically opening an inlet check valve of one chamber and an outlet valve of the other chamber whereby hydraulic fluid will be withdrawn from one of said chambers during the intake stroke of said pump means and supplied to the other of said chambers during the delivery stroke of said pump means.

2. In combination, a hydraulic actuator having a cylinder with a reciprocable piston disposed therein, said piston dividing said cylinder into opposed chambers which are filled with hydraulic fluid, accumulator means in only one of said chambers for preventing the formation of voids in said chambers when fluid is withdrawn from either of said chambers, pump means having an intake stroke and a delivery stroke, means interconnecting each actuator chamber and said pump means including pairs of oppositely seated, normally closed, one-way check valves, said check valves being capable of pressure actuation to an open position, and manually operable means for mechanically opening one check valve of each pair which are seated in opposite directions whereby hydraulic fluid will be withdrawn from one of said chambers during the intake stroke of said pump means and supplied to the other chamber during the delivery stroke thereof.

3. A closed hydraulic loop actuator system including in combination, a hydraulic actuator having a cylinder with a reciprocable piston disposed therein, said piston dividing said cylinder into a pair of opposed chambers which are filled with hydraulic fluid, accumulator means in only one of said chambers for preventing the formation of voids in said chambers when hydraulic fluid is withdrawn from either of said chambers, a pair of serially arranged, normally closed check valves communicating with each chamber, said check valves being capable of pressure actuation to an open position, each pair of check valves including an inlet valve seated in one direction and an outlet valve seated in the opposite direction, pump means communicating with said check valves, motor means for actuating said pump means, and manually operable means for mechanically opening the inlet check valve of one pair and the outlet check valve of the other pair and simultaneously activating said motor means, said pump means having an intake stroke and a delivery stroke whereby hydraulic fluid will be withdrawn from one of said chambers during the intake stroke and supplied to the other of said chambers during the delivery stroke.

4. In combination, a hydraulic actuator having a cylinder with a reciprocable piston disposed therein, said piston dividing said cylinder into a pair of opposed chambers which are filled with hydraulic fluid, an accumulator disposed in only one of said chambers comprising a body of closed cell plastic foam for preventing the formation of voids in said chambers when hydraulic fluid is withdrawn from either of said chambers, pump means having an intake stroke and a delivery stroke, a pair of normally closed hydraulically interconnected inlet check valves seating in one direction and communicating with said pump means, a pair of normally closed outlet check valves seating in the opposite direction, each outlet check valve being hydraulically connected with one of said inlet check valves, each of said outlet check valves communicating with one of said chambers, said check valves being capable of pressure actuation to an open position, and manually operable means for mechanically opening one of said inlet check valves and an opposed one of said outlet check valves whereby hydraulic fluid will be withdrawn from one of said chambers during the intake stroke of said pump means and supplied to the other of said chambers during the delivery stroke of said pump means.

5. In combination, a hydraulic actuator having a cylinder with a reciprocable piston disposed therein, said piston dividing said cylinder into a pair of opposed chambers which are filled with hydraulic fluid, an accumulator disposed in only one of said cylinders comprising a torus of closed cell plastic foam for preventing the formation of voids in said chambers when hydraulic fluid is withdrawn from either of said chambers, a pair of serially arranged, normally closed check valves communicating with each chamber, said check valves being capable of pressure actuation to an open position, each pair of check valves including an inlet valve seating in one direction and an outlet valve seating in the opposite direction, pump means communicating with the inlet valve of each pair, said pump means having an intake stroke and a delivery stroke, and manually operable means for mechanically opening an inlet check valve of one pair and an outlet check valve of the other pair whereby hydraulic fluid will be withdrawn from one of said chambers during the intake stroke of said pump means and supplied to the other of said chambers during the delivery stroke thereof.

6. The combination set forth in claim 5 wherein said check valves include axially extending stems, and wherein said manually recited means comprise pivotally mounted lever means, opposite ends of which are engageable with the stems of each pair of check valves.

References Cited in the file of this patent

UNITED STATES PATENTS

| | | |
|---|---|---|
| 337,118 | Belden | Mar. 2, 1886 |
| 1,582,468 | Heald et al. | Apr. 27, 1926 |
| 2,323,519 | Dean | July 6, 1943 |
| 2,352,390 | Kirkland | June 27, 1944 |
| 2,357,386 | Dick | Sept. 5, 1944 |
| 2,390,716 | Kelly | Dec. 11, 1945 |
| 2,482,792 | Owen | Sept. 27, 1949 |
| 2,536,709 | Ashton et al. | Jan. 2, 1951 |
| 2,573,993 | Sedgwick | Nov. 6, 1951 |
| 2,597,050 | Audemar | May 20, 1952 |
| 2,889,851 | Audemar | June 9, 1959 |